United States Patent [19]

Abel

[11] E Patent Number: Re. 32,020

[45] Reissued Date of Patent: Nov. 5, 1985

[54] MULTIPLE-PURPOSE SAW BLADE SUSPENSION ARRANGEMENT FOR RECIPROCATING SAWS

[76] Inventor: Helmut Abel, 43 Ave. Berryer, 78600 Maisons-Lafitte, Paris, France

[21] Appl. No.: 486,027

[22] Filed: Apr. 18, 1983

Related U.S. Patent Documents

Reissue of:

[64] Patent No.: 3,878,876
Issued: Apr. 22, 1975
Appl. No.: 431,930
Filed: Jan. 9, 1974

[30] Foreign Application Priority Data

Feb. 14, 1973 [FR] France ..... 73.05102
Apr. 9, 1973 [FR] France ..... 73.12617

[51] Int. Cl.[4] ..... B27B 19/02; B23D 49/06

[52] U.S. Cl. ..... 83/783; 83/662; 30/506

[58] Field of Search ..... 145/32 R, 32 A, 32 B, 145/110, 33 R, 111, 112, 33 A, 33 AB, 33 D, 33 F; 30/394; 83/783, 784, 786, 698, 581.1, 662

[56] References Cited

U.S. PATENT DOCUMENTS 131,323 9/1872 Atkinson et al. .
2,646,089 7/1953 Gaskill .
2,692,622 10/1954 Heese .
2,772,708 12/1956 Miquel .
2,792,033 5/1957 Bradley .

FOREIGN PATENT DOCUMENTS 125273 11/1901 Fed. Rep. of Germany .... 145/32 R
259043 10/1912 Fed. Rep. of Germany .

OTHER PUBLICATIONS

Barnes Wood Working Electric Bench Saw–Enclosed Exhibits.

Letter from J. David Wharton of Kokjer, Kircher, Bradley, Wharton, Bowman & Johnson, dated 11-1-9-82.

*Primary Examiner*—Roscoe V. Parker
*Attorney, Agent, or Firm*—Costas S. Krikelis

[57] ABSTRACT

To floatingly support a saw blade in a frame, the frame is formed, at its free ends, with forked elements; clamping elements are clamped to the saw. The engagement between the forked element (the blade fitting between the gap in the fork) and the clamping element is by means of a depression-projection fulcrum engagement, so that the clamping element, to which the saw blade is attached, can rock or tilt with respect to the forked element, attached to the frame, thus avoiding holding stresses on the saw blade which lead to breakage of the blade at the attachment or clamping points.

10 Claims, 16 Drawing Figures

FIG.1
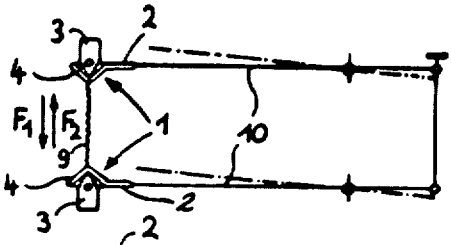
FIG.1a
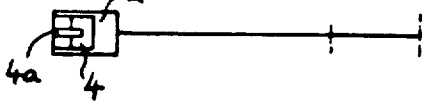
FIG.5
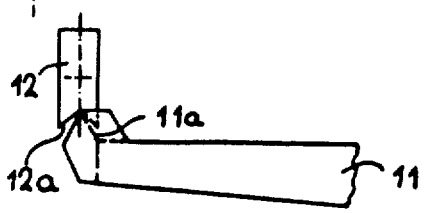
FIG.5a
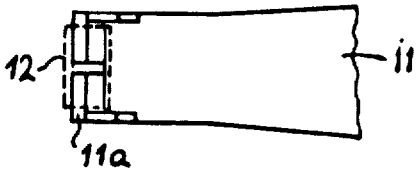
FIG.2
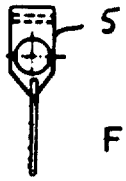
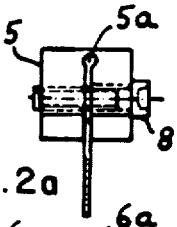
FIG.2a
FIG.3
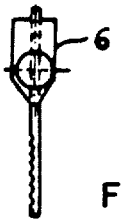
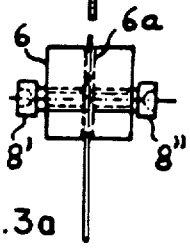
FIG.3a
FIG.6
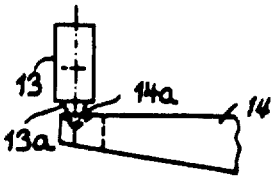
FIG.6a
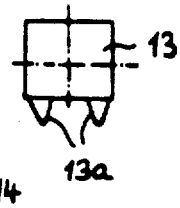
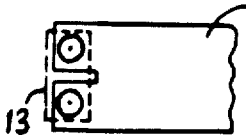
FIG.6b
FIG.4
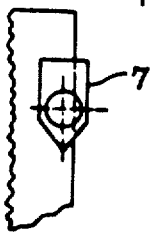
FIG.4a
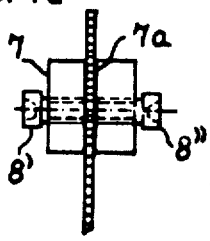
FIG.7
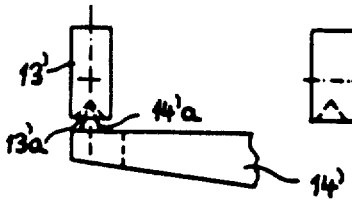
FIG.7a
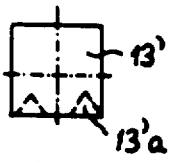
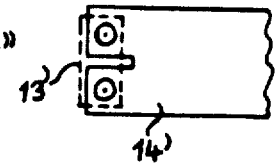
FIG.7b

MULTIPLE-PURPOSE SAW BLADE SUSPENSION ARRANGEMENT FOR RECIPROCATING SAWS

Matter enclosed in heavy brackets [ ] appears in the original patent but forms no part of this reissue specification; matter printed in italics indicates the additions made by reissue.

The present invention relates to saw blade mounting or suspension devices for a saw blade which is fixed to a saw frame at or adjacent both ends of the blade. Such devices are especially suitable for mechanically driven scroll-saws or fret-saws.

Saw blade mounting devices of conventional reciprocating saws, the blades of which are fixed at both ends, have a number of disadvantages. Firstly, only a particular type of blade can be supported by each mounting device. Secondly, known saw blade mounting devices do not permit a technically correct and economic use of the various fine blades for scroll-work or fret-work commercially obtainable. This is due to the reason that existing mounting devices are either of an entirely rigid construction or they are movably mounted, for example, by means of an axle resting on a concave seat, but as soon as the required blade tension which is necessary for precise and correct cutting is reached, the device becomes rigid as a result of exessive frictional resistance between the fixing angle and its supporting concave seat, and owing to dust and dirt. This is why in most cases, saw blades used for scroll-work break by fatigue after only a very short period of use, the fracture occurring mainly at the fixing zones.

The saw blade suspension device according to the present invention offers the possibility of using alternatively and without any problem the following types of blades:

(a). all flat blades, for example, between a size of 0.3 mm thickness×0.5 mm width (which are extremely thin saw blades for scroll-work) and 1.5 mm thickness×20 mm width;

(b). all spiral blades, for example, with a diameter of 0.5 mm up to and even above 3 mm. and (c) within a certain range of size, even files of various sections, as they are normally used on filing machines, can also be mounted in the suspension device.

In order that the present invention may be more readily understood, reference will now be made to the accompanying drawing, in which:

FIGS. 1 and 1a show, schematically, side and end elevations, respectively, of a saw fitted with one embodiment of the invention;

FIGS. 2 and 2a, 3 and 3a, 4 and 4a show, schematically, side and end views, respectively, of three different suspension clamps which may be used with the suspension device illustrated in FIG. 1;

FIGS. 5 and 5a show, schematically, side elevation and plan views, respectively, of another embodiment of the invention;

FIGS. 6, 6a and 6b show, schematically, a side elevation, an end view and a plan view, respectively, of a third embodiment; and FIGS. 7, 7a and 7b show, schematically, a side elevation, an end view and a plan view, respectively, of an alternative form of the embodiment shown in FIG. 6.

Referring to the drawing, FIG. 1 shows a scroll-saw or fret-saw equipped with saw blade suspension devices constructed in accordance with the invention and operating on the basis of a parallelogram system. The suspension device permits the use of nearly all commercial types of saw blade for straightlined or for curvilinear cutting. The type of saw blade can be freely chosen according to the kind of work and the material to be cut (wood, synthetic materials, steel and other metals, etc.).

The saw blade suspension devices 1, shown in FIG. 1 comprises two fork-shaped elements 2 and a pair of blade clamps 3. The two forked-shaped elements are symmetrically arranged back to back and each have a hollow V-shaped seat 4 with lateral stop faces. The hollow seat is provided with a central slot 4a which extends from the free end of the hollow seat to about three-quarters of the way through the V in the longitudinal direction of the fork. Each of the blade suspension clamps 3 have, at one end, a slightly rounded prism or wedge shape which rests in the hollow seat of the fork. [The] *Such rounding as may exist must be minimal so that the* edge of the prism or wedge serves as a fulcrum which ensures linear contact between the clamp and the fork-shaped element. Each clamp is provided with one or more openings into which the selected saw blade is introduced. These openings have either the shape of incisions which interrupt the edge of the clamp and which traverse the clamp horizontally, or they form a U-shaped groove, a pocket hole or a through hole, where the holes can be of round, triangular, polygonal, quadratic or rectangular shape. With the exception of the incisions mentioned above, these openings (U-shaped groove, holes, etc.) extend vertically through the saw blade clamp.

FIGS. 2, 3 and 4 show, respectively, three saw blade clamps 5, 6 and 7 having a generally similar external shape but differing in the kind of openings 5a, 6a and 7a respectively with which they are provided. The different kinds of clamps are used according to the type of blade to be supported. Each saw blade clamp has, parallel to its contact edge or vertically to its front face a tapped hole for the introduction of one or two screws 8, 8', 8'', which ensure that the blade 9 and the clamp are secured together properly.

In the case of the clamps 6 and 7 (FIGS. 3, 4), the actual attachment point is situated only little above the contact edge of the clamp. However, in the case of the clamp 5, which may be used for extremely fine and fragile saw blades for instance with a cross-section of 0.3 mm×0.5 mm, the connection between clamp and blade is on the level of the contact edge.

The angle between the arms of the hollow V-shaped seat 4 of the forks 2 is, of course, always wider than the angle between the sides of the saw blade clamps which form the wedge or the prism end of the clamps. Thus, the clamps and the forks when fitted together form a rockable or floating mounting. Due to the extremely low friction in the rockable or floating mounting *because of the substantially linear contact between the cooperating shaped seat and the suspension clamp* (which is most important for the use of very thin saw blades for scroll-work) the supported saw blade 9 (FIG. 1) remains in a vertical position, even under extreme tension and even if in the hollow V-shaped seat 4 of the fork 2 there is an accumulation of dust and dirt shavings, or cutting chips. The vertical position of the saw blade 9 remains unchanged in spite of extremely rapid reciprocative movement of the arms of the saw (for instance 3000 strokes per minute) in directions indicated by $F_1$ and $F_2$ in FIG. 1, and in spite of the fact that the two sets of angles, which are formed by the saw blade 9 and the arms 10 of the saw, rapidly and continuously change.

In the case of the scroll-work, where very thin blades are used, it has always been a problem to keep the manual advance pressure of the blades within tolerable limits. The present saw blade clamps eliminate such problems due to the fact that, as soon as a sudden advance pressure is applied, the saw blade, under tension, immediately forms a continuous arc so that there is no formation of an upsetting and lengthening zone in the clamping areas, which normally leads to fatigue fractures of the saw blade.

The blade clamps 6 and 7 are designed to accommodate saw blades having a certain excess length or even blades which have been cut off from a long saw blade, such as band saw blades. In such cases it is by no means necessary to cut the blade to a predetermined length since the clamps can be positioned at practically any place of the blade. The blade clamps as described above furthermore allow the reuse of blades, a certain part of which may have become dull by use. In such cases it is simply necessary to shift the blade in the clamps so that there is no longer any contact with the blunt cutting zone and the material to be cut.

The system of mounting saw blades by means of forks and clamps is in no way restricted to the embodiment described in FIGS. 2, 3 and 4.

With regard to the suspension principle of the blade, the rockable type mounting device may also comprise two supporting elements 11 as shown in FIG. 5. Each has prismatically shaped projections 11a and clamps 12, which have a prismatic hollow seat 12a. This is, in principle, the reverse of the embodiment shown in FIG. 1.

FIG. 6 shows another embodiment having blade clamps 13 equipped with rounded contact pins 13a which are located in seats of diples 14a in a correspondingly shaped supporting element 14. *In practice, whenever thin blades are used in the clamp depicted in FIG. 2., the lower portion of this clamp is squeezed together to secure the blade.*

FIG. 7 illustrates the reverse of the embodiment shown in FIG. 6.

Whilst particular embodiments have been described, it will be appreciated that various modifications can be made without departing from the inventive concept. For example, the application of the system as a whole is not restricted to reciprocating motion saws, of the type shown in FIG. 1. It can be employed for any other type of reciprocating saw where the blades are fixed at or adjacent both ends, for example handoperated scroll-saws, coping saws, pattern saws, and the like.

What is claimed is:

1. In a saw frame, a saw blade suspension arrangement for a saw blade (9) which is fixed at or adjacent its opposite ends to the saw frame (10), comprising a clamping element (3, 5, 6, 7) located adjacent at least one end of the blade for attachment to the saw blade (9);

a fork-shaped element (2, 11, 14, 14') disposed at one end of said frame and rockably mounting said clamping element on the outside of the saw frame, to permit the saw blade (9) to extend through the fork gap to its opposite end attachment to maintain the clamping element in engagement, said rockable fork-shaped element and the clamping element being shaped to form a projecting fulcrum on one of said elements and a V-shaped or similarly shaped hollow seat in the other one of said elements , *the projecting fulcrum comprising a contact edge providing essentially a line contact with said V-shaped or similarly shaped hollow seat.*

2. Arrangement as claimed in claim 1, wherein the fork-shaped element of the saw has a V-shaped hollow seat provided with lateral stopping faces, and the clamping element has a fulcrum edge in the form of a prismatic or wedge shaped end.

3. Arrangement as claimed in claim 1, wherein the fork-shaped element is provided with prismatic or wedge-shaped projections serving as a fulcrum and formed with lateral stopping faces, and the clamping element has an essentially V-shaped hollow seat to receive the fulcrum projection.

[4. Arrangement as claimed in claim 1, wherein (FIG. 6) the fork-shaped element (14) has at least two conically-shaped hollow seats (14a) and the clamping element (13) is formed with generally conically shaped, or similarly tapered projections (13a) to be located in the conically-shaped hollow seats and serve as fulcrums.]

[5. Arrangement as claimed in claim 1, wherein (FIG. 7) the fork-shaped element (14') is provided with two or more conically-shaped, or other similarly tapered projections (14'a), and the clamping element (13') has conically-shaped hollow seats (13'a).]

6. Arrangement as claimed in claim 1, wherein the clamping element has an incision which interrupts the contact edge of the clamp and which traverses the clamp to separate the clamping element into two end portions;

and means to clamp the saw blade when introduced into the incision in the clamping element *wherein the connection between the clamp and the saw blade is substantially on the level of said line contact between the clamping element and the seat.*

7. Arrangement according to claim 1, wherein the clamping element has an incision which separates the interior portion of the clamping element into two interior parts;

and means to clamp the saw when introduced into the incision in the clamping element.

8. Arrangement according to claim 1, wherein the clamping element has a U-shaped incision, or groove to permit introduction of the end of the saw blade therein.

9. Arrangement according to claim 1, wherein the angle of divergence of the V-shaped or similarly shaped hollow seat is greater than the angle of the fulcrum point, or edge, to provide a freely rockable, floating connection permitting self-alignment of the blade.

*10. Arrangement according to claim 1, wherein the clamping element has an incision which interrupts the contact edge of the clamp and separates the interior portion of the clamping element into two interior parts, and means to clamp the saw blade when introduced into the incision in the clamping element, thereby firmly holding the blade within the incision.*

*11. In a saw frame, a saw blade suspension arrangement for a saw blade (9) which is fixed at or adjacent its opposite ends to the saw frame (10), comprising a clamping element (3, 5, 6, 7) located adjacent at least one end of the blade for attachment to the saw blade (9);*

*a fork-shaped element (2, 11, 14, 14') disposed at one-end of said frame and rockably mounting said clamping element on the outside of the saw frame to permit the saw blade (9)to extend through the fork gap to its opposite end attachment to maintain the clamping element in engagement, said rockable fork-shaped*

*element and the clamping element being shaped to form a projecting fulcrum on one of said elements and a V-shaped or similarly shaped hollow seat in the other one of said element, the fork shaped element (14) has at least two conically-shaped hollow seats (14a) and the clamping element (13) is formed with generally conically shaped, or similarly tapered projections (13a) to be located in the conically-shaped hollow seats and serve as fulcrums.*

*12. In a saw frame, a saw blade suspension arrangement for a saw blade (9) which is fixed at or adjacent its opposite ends to the saw frame (10), comprising a clamping element (3, 5, 6, 7) located adjacent at least one end of the blade for attachment to the saw blade (9); a fork-shaped element (2, 11, 14, 14') disposed at one-end of said frame and rockably mounting said clamping element on the outside of the saw frame to permit the saw blade (9) to extend through the fork gap to its opposite end attachment to maintain the clamping element in engagement said rockable fork-shaped element and the clamping element being shaped to form a projecting fulcrum on one of said elements and a V-shaped or similarly shaped hollow seat in the other one of said elements, the fork-shaped element (14') is provided with two or more conically-shaped, or other similarly tapered projections (14'a), and the clamping element (13') has conically-shaped hollow seats (13'a).*

* * * * *